United States Patent [19]
Damon et al.

[11] 3,791,783
[45] Feb. 12, 1974

[54] APPARATUS FOR FORMING FIBER PREFORMS

[75] Inventors: Ronald L. Damon, Thompson; Arthur J. Wiltshire, Cleveland, both of Ohio

[73] Assignee: Structural Fibers, Inc., Chardon, Ohio

[22] Filed: June 28, 1971

[21] Appl. No.: 157,434

[52] U.S. Cl. .............. 425/82, 156/62.4, 156/285, 264/91, 264/128
[51] Int. Cl. .................... B29c 5/04, B29c 5/06
[58] Field of Search ..... 156/62.4, 285; 264/91, 121, 264/128, 310, 311; 425/80, 82, 99, 100, 103

[56] References Cited
UNITED STATES PATENTS

| | | | |
|---|---|---|---|
| 3,687,587 | 8/1972 | Wiltshire | 425/80 |
| 3,654,002 | 4/1972 | Wiltshire | 264/91 X |
| 3,177,275 | 4/1965 | Brenner | 425/82 X |
| 3,381,069 | 4/1968 | Simison | 264/121 X |
| R25,587 | 6/1964 | Wiltshire | 425/82 X |
| 2,870,054 | 1/1959 | Amos et al | 425/434 X |

Primary Examiner—R. Spencer Anear
Attorney, Agent, or Firm—McNenny, Farrington, Pearne & Gordon

[57] ABSTRACT

A machine for fabricating fibrous preforms which may be used in molding fiber-reinforced plastic articles by impregnating the preform with a suitable thermosetting resin. The preform is a unitary, seamless, porous cylinder having a closed bottom and comprises short lengths of fibers which are bonded together by a cured resin binder. The machine according to this invention includes a screen form which defines the shape of the preform to be formed. The form has an open mouth, a cylindrical sidewall, and a closed opposite end and is mounted for rotation about its horizontal axis. The outside surface of the screen form is substantially enclosed by a chamber, and an exhaust fan is provided in the chamber to draw air through the form from the inside to the outside thereof. A fiber dispenser, which comprises a tube, extends into the screen form and includes a chopper at one end for chopping continuous filaments into short lengths. The chopped filaments are blown through the tube and are deposited on the screen as the screen is rotated. The tube is mounted on a carriage and is movable from an initial position wherein its discharge mouth is located closely adjacent the center of the closed end of the screen, to a position which is closely spaced from the sidewall of the screen, and then along the sidewall to the open mouth of the screen. A binder resin dispenser is provided adjacent the discharge mouth of the tube so that the binder resin is deposited on the fibers as they are deposited on the screen.

4 Claims, 4 Drawing Figures

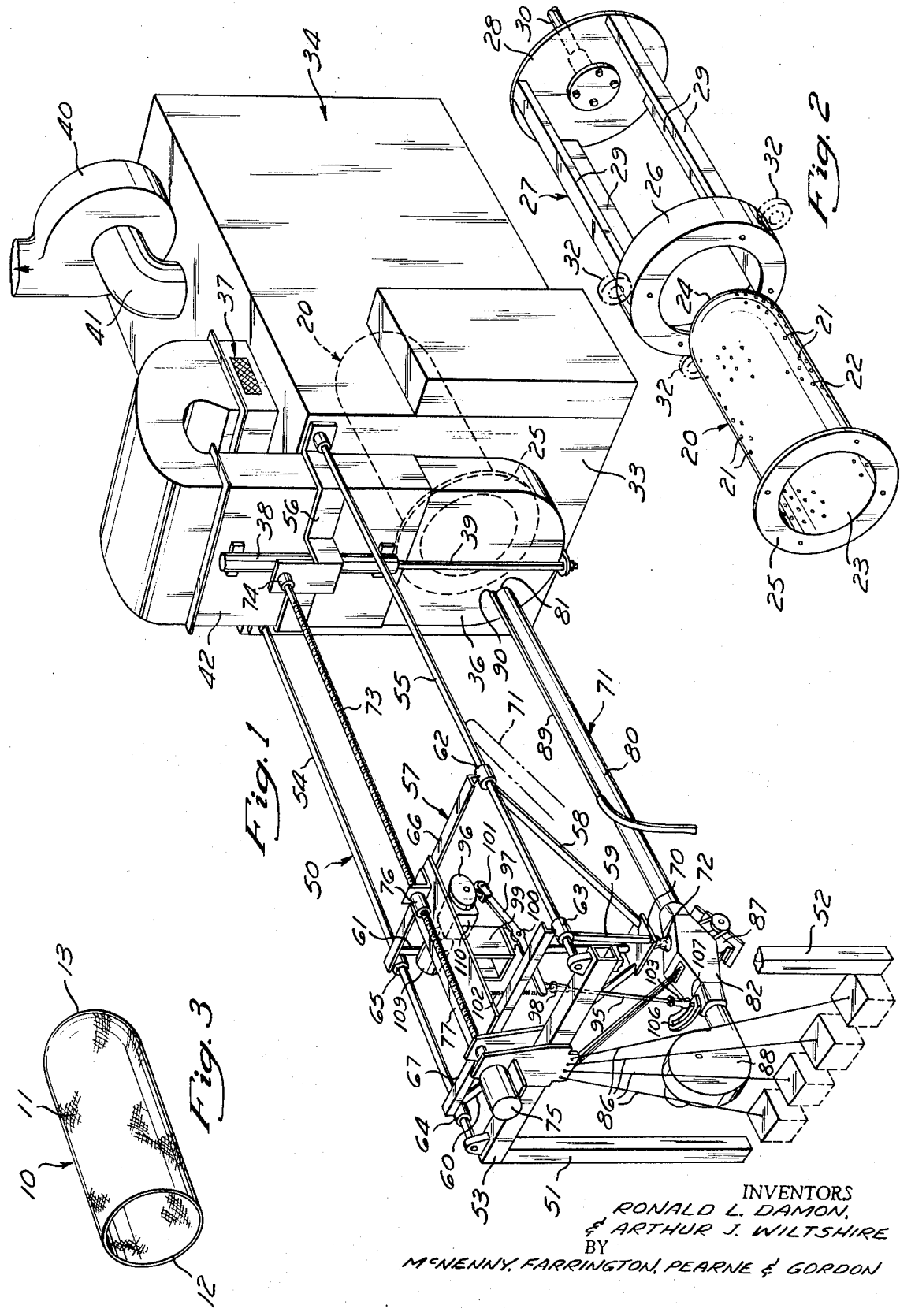

INVENTORS
RONALD L. DAMON,
ARTHUR J. WILTSHIRE
BY
McNENNY, FARRINGTON, PEARNE & GORDON
ATTORNEYS

APPARATUS FOR FORMING FIBER PREFORMS

BACKGROUND OF THE INVENTION

This invention relates to the manufacture of hollow, fiber-reinforced, plastic articles such as tanks, and, more particularly, to a machine for manufacturing fiber preforms which are to be impregnated with a curable resin to form the finished tank. In the manufacture of such articles, randomly oriented fibers are formed in the approximate shape of the article to be molded and held in that shape by a resin binder. The form is then encased within a rigid mold casing. An expandable bag, which will define the shape of the finished article, is placed within the laid-up form in the mold. The form is held in place in the mold by a suitably moderate pressure, by expanding the bag to hold the fiber form in place against the mold, and then the fiber form is partially permeated with a thermosetting resin or the like. The bag is subsequently expanded by further inflation to compress the fiber form in such a manner as to distribute the resin throughout the form and achieve the results of pressure molding, while at the same time avoiding migration of the fibers and destruction of the laid-up form.

The above-described process is set forth in U.S. Reissue Pat. No. 25,241 to Randolph. In the Randolph patent, the fiber form comprises a flat sheet of fiber matting which is wrapped into a cylindrical form to define the sidewall of a cylindrical tank. The top and bottom portions of the fiber form comprise, preformed fiber caps. According to the teachings of Randolph, therefore, a longitudinal overlap or seam is formed by the sidewall matting, and such a seam results in an unevenness in the amount of fiber-reinforcing material along the longitudinal overlapping portion of the matting. Furthermore, since the end preforms are separately formed, an overlapping joint is required between the sidewall mat and the preforms. Here again, an irregularity in the amount of reinforcing material is present at the overlapping joints. Still further, the lapping of the joints does not provide a uniform interlocking of the fibers in the area of the lap.

In order to overcome the above problems, techniques have been proposed for forming a fiber preform having a tubular section and an integral end thereon wherein the fibers forming the preform are uniformly distributed along the entire preform so that the final product provides a uniform high strength without excessive amounts of fiber in any location, and so that a finished article has no more than one seam. One such technique is set forth in copending U.S. application, Ser. No. 742,692, now U.S. Pat. No. 3,654,002, which is assigned to the same assignee as the present invention.

According to the procedure of the above-identified application, an elongated screen form is rotated about its longitudinal axis. A vacuum is applied to the interior of the screen form to draw air into the form while a large number of randomly oriented, chopped pieces of fiber are directed against the outside surface of the rotating form by a roving cutter which traverses the length of the form. The cutter is followed by a thermosetting resin binder spray to lock the fibers in place. The binder-impregnated fibers are then subjected to heat to cure the binder.

Although this technique overcomes the problems associated with a plurality of lap seams and reduces the expense of the form by eliminating the need for sidewall matting, it has been found that a considerable portion of the fibers is lost, since the screen form does not capture all the fibers on its sidewall. Furthermore, it is difficult to maintain outside diameter tolerances, since these tolerances are a function of the rate at which the fibers are deposited on the screen form, the rate of traverse of the fiber source along the form, and the rotational speed of the form. It is important to maintain the outside diameter of the preform, since the preform must be inserted within a hollow mold. If the outside diameter of the preform is too large, the preform cannot be inserted in the mold. If the outside diameter is too small, the preform may be inserted in the mold, but it will not conform to the inner mold surface, and an undersirable resin-rich layer may result in the final molded product, or the preform may split as a result of applied bag pressure.

In order to overcome many of the problems associated with the technique set forth in copending U.S. application, Ser. No. 742,692, a technique has been proposed for forming a fiber preform having a tubular section and an integral end thereon by providing a vertically mounted, rotating screen form. Chopped fibers are deposited by a dispenser, such as a roving cutter, along the inside surface of the rotating screen form. The dispenser moves in an axial direction relative to the screen form and closely follows the contour of the form, while the form itself is rotated about its vertical axis. The fibers are thrown against the screen form by the action of the cutter, and are held against the rotating screen form by enclosing the outside surface of the form in a vacuum chamber. This technique is set forth in copending U.S. application, Ser. No. 37,173, now U.S. Pat. No. 3,687,587, which is assigned to the same assignee as the present invention.

Since, according to the procedure set forth in U.S. application, Ser. No. 37,173, fibers are deposited on the inside surface of a rotating screen form, the outside diameter of the preform is accurately controlled and the loss of fibers is minimized. However, since the screen form is mounted in a vertical position, it is necessary to remove the entire screen form from its enclosing chamber by vertically raising the form and then tipping the form to a horizontal position to remove the finished preform. After the preform is removed, the screen must be tipped to a vertical position and then reinserted into the chamber. This procedure not only requires extra manufacturing operations, but also necessitates high ceiling clearance to accommodate the structure to perform the lifting operation.

SUMMARY OF THE INVENTION

This invention overcomes many of the problems associated with techniques according to the above-identified reissue patent and according to the above-identified copending application. Specifically, this invention permits the fabrication of fiber preforms having a controlled outside diameter without substantial loss of fibers and without removal of the screen from its enclosure after each preform is fabricated.

In accordance with this invention, chopped fibers are conveyed through a tube and are deposited against the inside surface of a rotating screen form. The rotating screen form is mounted in a horizontal position for rotation about its horizontal axis within a chamber. The screen is rotated about its horizontal axis at a speed less than the speed required to hold the fibers against its inside surface by centrifugal force. The fiber depositing end of the tube is positioned within the screen and is caused to follow the contour of the screen from a point closely adjacent the endmost portion of the screen and along a path which is spaced a uniform distance from the contour of the screen toward the open mouth of the screen. The path followed by the tube is determined by a preselected cam and cam follower assembly chosen for a particular application and by a carriage which mounts the tube. The fibers deposited on the screen are held in place by a vacuum chamber which surrounds the outside surface of the screen. After the fibers are deposited on the screen, they are coated with a thermosetting resin binder spray to lock the fibers in place. After complete withdrawal of the fiber-depositing tube from the interior of the screen, the open mouth of the screen is covered by a hood and heated air is drawn through the laid-up fibers to cure the resin binder and lock the fibers in place. The completed preform is removed from the screen by sliding the preform horizontally outwardly.

BRIEF DESCRIPTION OF THE DRAWINGS

FIG. 1 is a perspective view of a preform machine according to this invention, with certain portions broken away for clarity.

FIG. 2 is an exploded perspective view of a preform forming screen and its mounting arrangement for rotating the screen about its horizontal axis.

FIG. 3 is a perspective view of a preform produced in accordance with the teachings of this invention.

DETAILED DESCRIPTION OF THE INVENTION

Figure 4:
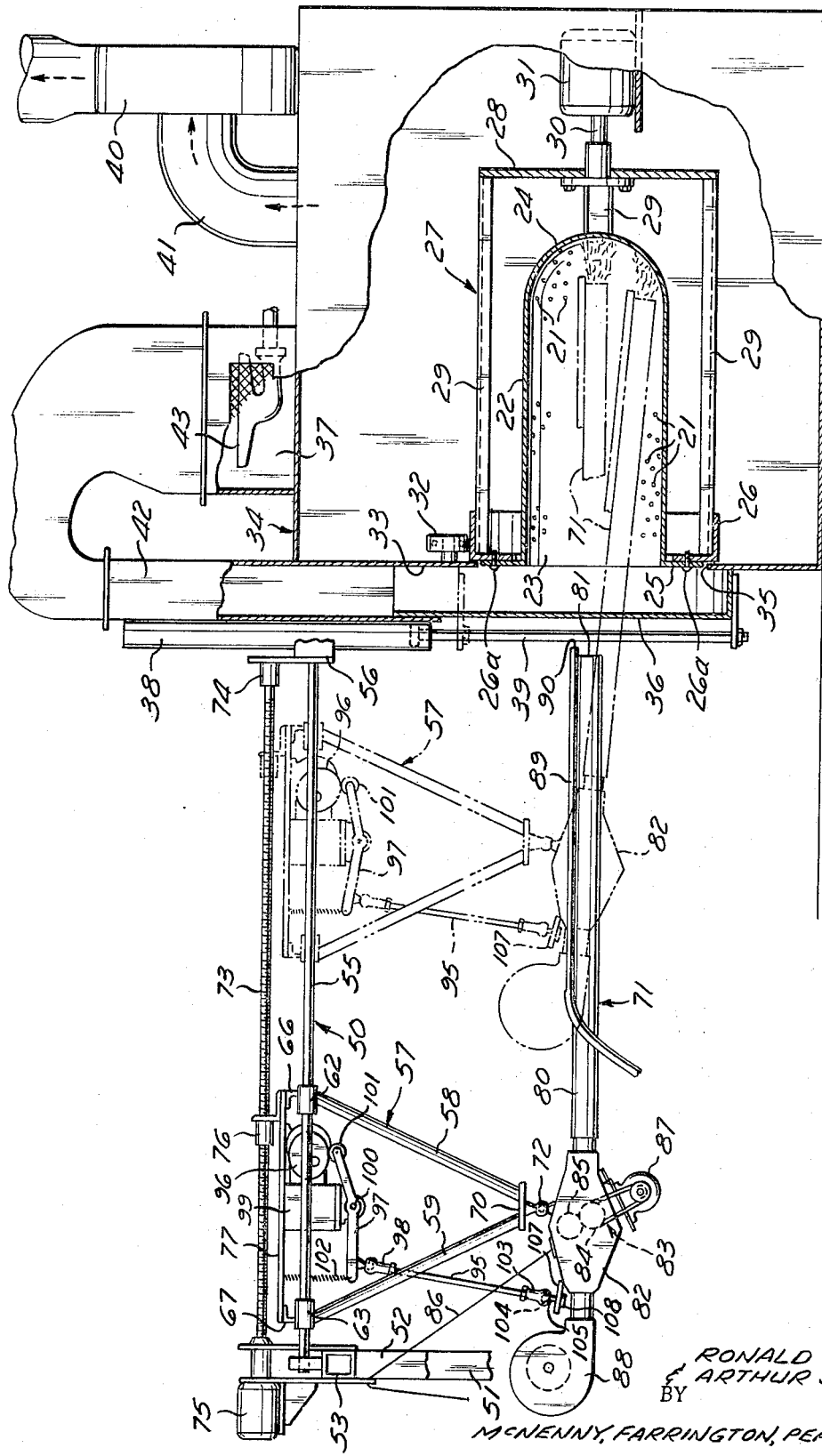
FIG. 4 is a side elevation, partly in section, of a preform machine according to this invention, with portions broken away for clarity, and showing certain elements of the machine in various operating positions.

Referring now to the drawings, and particularly to FIG. 3, a preform 10 produced in accordance with the present invention is illustrated. The preform 10 is particularly adapted for the manufacture of tanks of the type often used for water softeners or the like. The preform includes a cylindrical wall portion 11 extending from an open end 12 to a generally spherical, closed end 13. The preform wall is a porous structure consisting of a multitude of short lengths of fibers, such as glass fibers, randomly oriented in the wall forming the cylindrical portion 11 and the closed end 13. The fibers are interlocked with a settable resin such as a low-solubility, thermosetting polyester resin which does not fill the voids between the fibers. Therefore, the preform is relatively compressible and voids are provided so that the preform is well adapted for use in the manufacture of finished articles in accordance with the general method described in the Reissue patent cited above.

Reference should now be made to the remaining figures in the drawings for a clear understanding of a machine for manufacturing a preform of the type illustrated in FIG. 3. This machine includes a screen form 20 having a multiplicity of perforations 21 therethrough. The form 20 has a cylindrical sidewall 22 which extends between an open mouth 23 and a closed, generally spherical end portion 24. The inside surface of the wall 22 and the portion 24 define the desired external shape of the preform to be formed therein.

The screen form 20 has an annular flange 25 fixed to its open mouth 23 and the flange 25 is removably fixed to a drive ring 26 by bolts 26a. The drive ring 26 comprises a portion of a drive spider 27 having a drive plate 28 at one end, which is operably connected to the ring 26 by a plurality of drive fingers 29. The plate 28, and therefore the drive spider 27, is supported and driven about its horizontal axis by a drive shaft 30 of a motor 31. The ring 26 is supported for rotation by a plurality of rollers 32 which are rotatably supported on the front wall 33 of a housing 34.

The housing 34 completely encloses the drive spider 27 and the exterior surface of the screen form 20. The front wall 33 of the housing 34 has an opening 35 therein which exposes the interior of the screen form 20. For a purpose which will hereinafter become apparent, the opening 35 may be closed by a hood 36 which, when in a closed position over the opening 35, establishes communication between a heating chamber 37 and the interior of the screen form 20. The hood may be raised and lowered by a double-acting fluid cylinder 38 which drives a ram 39 connected to the lower portion of the hood 36. When the hood is in its raised position exposing the interior of the screen form 20, air may be drawn through the screen form from its inside surface to its outside surface by a blower fan 40 which draws air through a conduit 41 from the inside of the housing 34. When the hood 36 is in its lowered position, heated air is drawn into the screen form 20 by the fan 40 from the heating chamber 37 and through a duct 42 within which the hood 36 slides. It may be noted that a gas-fired burner 43 is provided in the chamber 37, although other heat sources may be employed.

The machine also includes a frame 50. The frame 50 comprises a pair of vertical supports 51 and 52 which are joined at their upper ends by a cross brace 53. A pair of guide rails 54 and 55 are fixed to the cross brace 53 and extend to the housing 34. The guide rails 54 and 55 are fixed to a strap 56 which extends around the duct 42 and the cylinder 38.

Carried by the guide rails 54 and 55 of the frame 50 is a carriage 57 which includes a plurality of hangers 58, 59, 60, and 61. Each hanger 58–61 has a guide bushing 62, 63, 64, and 65 at its upper end. The bushings 62 and 63 are slidably mounted on the guide rod 55 and the bushings 64 and 65 are slidably mounted on the guide rod 54. The bushings 62 and 65 are tied together by a brace 66 and the bushings 63 and 64 are tied together by a brace 67.

The lower end of each hanger 58–61 is fixed to a plate 70 which carries a dispenser 71 for dispensing chopped fibers in the screen form 20. The connection between the plate 70 and the dispenser 71 is a ball and socket connection 72 which, for reasons which will hereinafter become apparent, permits universal movement between the dispenser 71 and the plate 70.

There is provided means for uniformly advancing the carriage 57 along the guide rails 54 and 55 toward and away from the housing 34 to thereby uniformly advance the dispenser 71 into and out of the interior of the screen form 20. To this end, there is provided a lead screw 73 which is rotatably mounted at one end in a bearing 74, which is mounted adjacent the duct 42. The other end of the lead screw is rotatably driven by a variable speed, reversible motor 75 which is mounted above the crossbar 53. A threaded nut 76 is engaged by the lead screw 73 and the nut 76 is fixed to a crossplate 77 which extends between the braces 66 and 67 so that, when the motor 75 is energized, the carriage 57 is advanced at a uniform rate (depending upon the pitch of the lead screw 73 and the speed of the motor), toward the housing 34 and, upon reversal of the motor 75, the carriage 58 is retracted at a uniform rate.

The dispenser 71 includes an elongated, chopped fiber delivery tube 80 having a fiber depositing mouth 81 at one end. The other end of the tube 80 communicates with a plenum chamber 82 which houses a conventional filament chopper 83. The chopper 83 includes a first roller 84 having a multiplicity of radially extending blades (not shown) thereon and a rubber back-up roller 85 which cooperates with the roller 84. A plurality of continuous filaments 86 is trained between the rollers 84 and 85 and, upon operation of a motor 87, the rollers 84 and 85 are driven to chop the continuous filament into short lengths to form separated pieces of fiber. These fiber pieces are blown through the tube 80 by a blower or fan 88 which is mounted at the rear end of the plenum chamber 82. The tube 80 carries a binder resin supply tube 89 having a discharge orifice 90 which is adjacent the open mouth 81 of the tube 80.

The open mouth 81 of the tube 80 may be lowered from the position shown in solid outline in the drawings (which position is in axial alignment with the screen form 20) to a position which is in closely spaced adjacency with respect to the sidewall 22 of the screen form 20. To this end, the fiber dispenser 71 is suspended by the ball connection 72 so that its center of gravity is to the left of the connection 72, as viewed in the drawings, thus tending to permit the dispenser 71 to rotate in a counterclockwise direction. Such rotation, however, is prevented by a link 95 which maintains the fiber dispenser 71 in a preselected position determined by a cam 96. The upper end of the link 95 is connected to a bell crank 97 by a ball and socket connection 98 which permits universal movement between the bell crank 97 and the link 95. The bell crank 97 is pivotally connected to a hanger 99 by a pivot pin 100 and one arm of the bell crank 97 carries a cam follower 101 which engages the cam 96. The tendency of the fiber dispenser 71 to rotate in a counterclockwise direction ensures that the cam follower 101 will always engage the cam 96. To prevent undue pressure of the cam follower 101 on the cam 96, a counterbalance spring 102 is provided which biases the other arm of the bell crank 97 upwardly.

The lower end of the link 95 is provided with a socket 103 which receives a ball 104 (FIG. 4) having a pin 105 projecting therefrom. The pin 105 extends through an arcuate slot 106 (FIG. 1) provided in a plate 107 fixed to the plenum chamber 82. The end of the pin 105 has a flat head portion 108 which bears against the bottom surface of the plate 107.

Rotation of the cam 96 by a motor 109 through a suitable reduction gear box 110 (FIG. 1) causes the open mouth 81 of the tube 80 to move between the position shown in solid outline in the drawings and a lowered position. The swivel connection 72 permits the fiber dispenser 71 to be manually swung from the position illustrated in solid outline in FIG. 1 to the position illustrated in phantom outline in that Figure. During this swinging movement, the pin 105 slides along the slot 106.

OPERATION

The machine is preferably controlled by a suitable automated control system to automatically operate through a predetermined cycle. Suitable limit switches and control circuits are provided for this automated operation. However, the circuitry is not illustrated, since persons skilled in the art can easily provide suitable circuits to produce the desired operational cycle.

At the beginning of a cycle, the hood 36 is in a raised position, exposing the interior of the screen form 20, and the dispenser 71 is in the position shown in solid outline in FIGS. 1 and 4. The blower 40 is energized to draw air into the screen form and then outwardly through the perforations 21 in the screen form. The motor 31 is energized to rotate the screen form about its horizontal axis, the blower 88 and the motor 75 are energized. The motor 75 is operated at a relatively high speed to cause a rapid traverse of the carriage 57 to the position illustrated in phantom outline in FIG. 4. When the carriage 57 attains its forward position, and with the open end 81 of the tube 80 in axial alignment with the horizontal axis of the form 20, the motor 87 is energized to operate the roving cutter 83.

As the roving is cut, the short lengths of fiber are blown through the tube 80 and, due to the combined suction on the screen form 20 by the blower 40 and the blowing pressure caused by the blower 88, fibers are deposited against the interior of the screen form at the center of the closed end 24 of the form. Shortly after the beginning of fiber deposition, binder resin is pumped through the nozzle 90 and sprayed onto the fibers to lock them in place.

After a short period which is sufficient to cause a desired fiber thickness at the end of the screen form, the motor 109 is actuated to cause the tube 80 to move from its upper phantom outline position in FIG. 4 to its lower phantom outline position. During this movement, fibers are deposited over the entire curved surface of the end portion 24, due to the rotation of the screen form 20. When the tube 80 reaches its lowered position, the motor 109 is de-energized and the motor 75 is energized at a relatively slow speed and in a direction opposite the previously described fast traverse direction.

When the motor 75 is energized in this manner, the tube 80 is retracted from the interior of the screen form and the open mouth 81 of the tube 80 is caused to follow a path which is closely spaced with respect to the sidewall 22 of the screen form 20. This ensures that a uniform layer of fibers will be deposited on the surface 22. The rate of withdrawal is uniform and is predetermined so that the layer of fibers laid on the sidewall 22 of the screen form 20 is uniform and has a predetermined thickness.

When the open mouth 81 of the tube 80 reaches a position adjacent the open mouth 23 of the screen form 20, the motor 87 is turned off to stop the cutter 83 and the blower 88 is de-energized. After a short delay, the resin is shut off and when the carriage 57 reaches its solid outline position, the motor 75 is de-energized to stop the carriage.

When the open mouth 81 of the tube 80 fully retracted, the double-acting cylinder 38 is actuated to lower the hood 36 over the open mouth of the screen form 20. Heated air is thereby drawn from the heating chamber 37 through the duct 42 into the screen form 20, and through the binder-coated fibers which have been deposited on the screen form. After a predetermined time period, the binder resin is cured and the hood 36 may be raised to enable the operator to remove the finished preform from the screen form 20.

To facilitate the preform removal operation, the fiber dispenser 71 is manually swung to the position illustrated in phantom outline in FIG. 1. Prior to the next machine cycle, the motor 109 is actuated to raise the tube 80 into axial alignment with the screen form 20.

It should be appreciated that during the curing operation, the hot air exhausted by the fan 40 may be recycled through the screen form 20 by a suitable duct system which will divert the heated exhausted air back through the duct 42.

It should also be appreciated that the opening 35 in the housing 34 and the spider drive 27 may accommodate different diameter screen forms to produce preforms having various diameters and lengths.

The invention is not restricted to the slavish imitation of each and every detail set forth above. Obviously, devices may be provided which change, eliminate, or add certain specific details without departing from the scope of the invention.

What is claimed is:

1. Apparatus for making fibrous preforms for use in molding fiber-reinforced plastic articles, comprising a perforated form which defines the shape of the preform to be formed, said form having an open mouth, a cylindrical sidewall, and a closed opposite end and having its outside surface substantially enclosed by a chamber, fan means for exhausting air from said chamber to draw air through said form, means for mounting said form in a horizontal position and for rotating said form about a horizontal axis of the form, said mounting and rotating means including a motor having a drive shaft, a driving plate fixed to said drive shaft, drive fingers fixed to and extending from said driving plate, drive ring means having a central opening fixed to the other end of said drive fingers, means for mounting said screen form within the opening in said drive ring, and roller means fixed on said housing for supporting said drive ring, means for dispensing chopped fibers within said form, said dispensing means having a discharge end, means for initially positioning said discharge end at a location which is closely spaced from said closed end of the form and on the axis of said form, means for moving said discharge end from its initial position to a location which is closely spaced from said cylindrical sidewall while substantially following the contour of said closed end and for then moving said discharge end along the extent of said sidewall while maintaining the space between said discharge end and said sidewall, whereby fibers are deposited against the entire inner surface of said form and are retained thereon by said vacuum.

2. Apparatus according to claim 1, wherein said fiber dispensing means comprises a hollow tube having said discharge end at one end and having a fiber chopper at said other end and having blower means for blowing said fibers through said tube.

3. Apparatus according to claim 2, wherein said moving means includes a carriage supported by guide rods for movement toward and away from said screen form.

4. Apparatus according to claim 3, wherein said moving means includes a motor driven lead screw for moving said carriage.

* * * * *